(12) United States Patent
Kurtz et al.

(10) Patent No.: US 7,516,675 B2
(45) Date of Patent: Apr. 14, 2009

(54) JOYSTICK SENSOR APPARATUS

(75) Inventors: Anthony D. Kurtz, Saddle River, NJ (US); Adam Kane, Morristown, NJ (US); Richard J. Martin, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 11/824,920

(22) Filed: Jul. 3, 2007

(65) Prior Publication Data

US 2009/0007684 A1  Jan. 8, 2009

(51) Int. Cl.
*G01D 7/00* (2006.01)
(52) U.S. Cl. .................................. 73/862.041
(58) Field of Classification Search ............................... 73/862.041–862.046
See application file for complete search history.

(56) References Cited

U.S. PATENT DOCUMENTS

| | | | | |
|---|---|---|---|---|
| 3,943,757 A * | 3/1976 | Wilhelm, Jr. | | 73/78 |
| 3,986,254 A * | 10/1976 | Nordstrom | | 29/613 |
| 4,388,668 A | 6/1983 | Bell et al. | | |
| 4,454,771 A | 6/1984 | Shimazoe et al. | | |
| 4,640,138 A * | 2/1987 | Meyer et al. | | 73/862.045 |
| 4,957,177 A * | 9/1990 | Hamilton et al. | | 177/211 |
| 5,002,901 A | 3/1991 | Kurtz et al. | | |
| 5,257,542 A | 11/1993 | Voss | | |
| 5,286,671 A | 2/1994 | Kurtz et al. | | |
| 5,402,684 A * | 4/1995 | Engeler et al. | | 73/794 |
| 5,461,001 A | 10/1995 | Kurtz et al. | | |
| 5,889,507 A * | 3/1999 | Engle et al. | | 345/161 |
| 5,891,751 A | 4/1999 | Kurtz et al. | | |
| 6,201,196 B1 * | 3/2001 | Wergen | | 200/6 A |
| 6,229,427 B1 | 5/2001 | Kurtz et al. | | |
| 6,386,036 B1 * | 5/2002 | Borza | | 73/574 |
| 6,439,056 B1 | 8/2002 | Jonsson | | |
| 6,533,507 B2 * | 3/2003 | Sailing | | 409/131 |
| 6,910,392 B2 * | 6/2005 | Lockery et al. | | 73/862.627 |
| 7,047,826 B2 * | 5/2006 | Peshkin | | 73/862.53 |
| 7,124,639 B1 | 10/2006 | Kurtz et al. | | |
| 7,171,857 B2 | 2/2007 | Barron | | |
| 7,212,096 B2 | 5/2007 | Kurtz et al. | | |

* cited by examiner

*Primary Examiner*—Max Noori
(74) *Attorney, Agent, or Firm*—The Plevy Law Firm

(57) ABSTRACT

A joystick apparatus employs a hermetically sealed load cell having strain gauges placed on flexible beams formed on the load cell. All of the strain gauges are on the same surface of the load cell and therefore wiring is performed on a single side of the load cell. The strain gauges are enclosed in hermetically sealed cavity. The sensing diaphragm consists of a concentric thick inner and outer section joined by thinner diametrically opposed beam elements. The thin beam elements are compliant members which can deflect. Each beam includes strain gauges or sensor elements and the load cell is coupled to a joystick which when moved causes the beams to deflect to cause the sensor elements to produce an electrical output proportional to the force and direction of the joystick. The sensor can yield an output proportional to any angle over the 360° movement of the joystick to provide outputs proportional to the X and Y positions of said joystick. Thus, the joystick arrangement can resolve any angle or force into X and Y components for full directional control.

14 Claims, 5 Drawing Sheets

JOYSTICK SENSOR APPARATUS

RELATED APPLICATIONS

Copending application entitled "Hermetically Sealed Displacement Sensor" filed on Dec. 30, 2005 as Ser. No. 11/322,721 is generally related to the present application.

FIELD OF THE INVENTION

This invention relates to sensors, in general and more particularly to a joystick sensor which is hermetically sealed.

BACKGROUND OF THE INVENTION

Joystick sensors have been widely employed and have been known for many years. These devices essentially include an elongated shaft or control rod, which rod is manipulated in the X and Y directions and can provide a 360° movement, whereby the sensor produces an output based on the position of the rod. Such joystick sensors have been used for steering controls for helicopters and other aircraft as well as many other applications. In particular, the most common joystick sensors were made to sense stress and deflection in the X and Y direction. Prior art designs were based on a complex bending beam which was designed to permit easy deflection on a section or portion of the beam in the X direction and on another section of the beam the Y direction. A typical prior art beam is shown in FIG. 1.

SUMMARY OF THE INVENTION

A joystick sensor apparatus, comprising: a load cell having a thick outer peripheral frame with a central thick hub area, the load cell having beams positioned between the central thick area and the outer peripheral frame, a plurality of strain gauges positioned on the beams and having at least a pair of strain gauges on diametrically opposed beams and a joystick coupled to the central hub area and operative when moved to cause the gauges when biased to provide outputs proportional to the X-Y movement of the joystick.

DETAILED DESCRIPTION OF THE INVENTION

Figure 1:
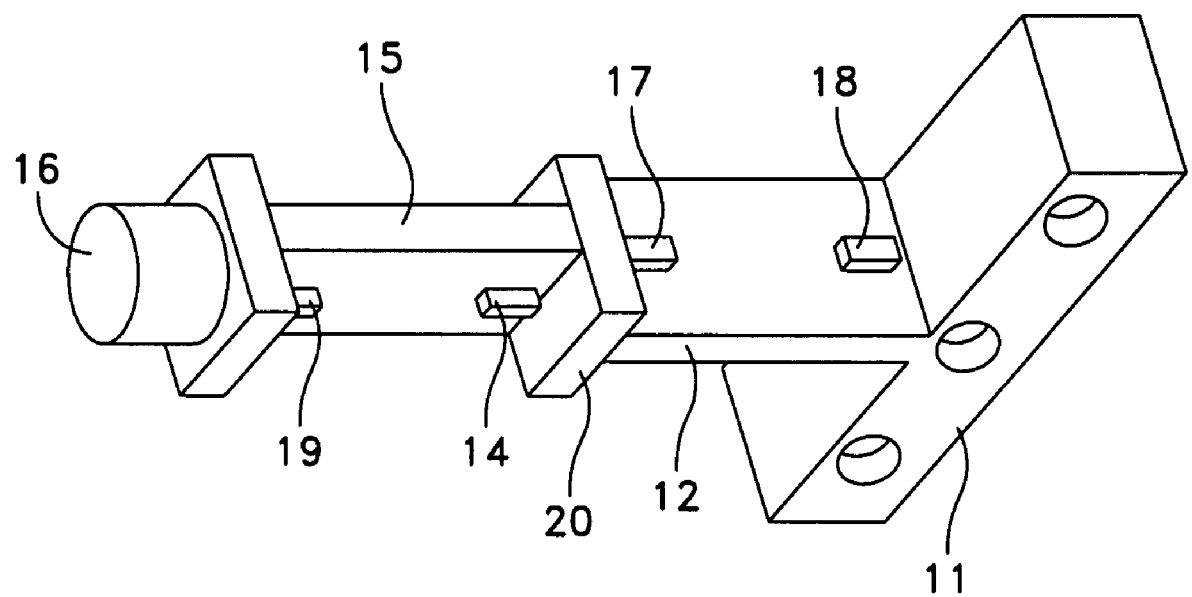
FIG. 1 is a perspective view of a prior art joystick employing sensor elements or strain gauges.

Referring to FIG. 1 there is shown a prior art joystick sensor. As seen in FIG. 1, the sensor has a base 11 which base could be secured to any suitable surface. Attached to the base 11 is a first beam section 12 which essentially is a Y sensing beam section. The beam section 12 has its major surface disposed along the Y axis and has sensors 17 and 18 located on the beam. The other side of the beam has corresponding sensors as 17 and 18. The sensors 17 and 18 on the front of the beam are wired to the two sensors on the other side of the beam to form a Wheatstone bridge. The beam is separated by a central solid square or rectangular member 20. Extending from the member 20 is a X axis sensing beam section 15. As one can ascertain, the sensing beam section 15 has its major surface disposed along the X-axis. Sensing beam 15 has positioned thereon strain gauges 19 and 14 on one side. Two other gauges are placed on the other side of the beam 15. The four sensors are wired in a Wheatstone bridge configuration. The section 16 basically is a joystick handle fitting. In the joystick sensor depicted in FIG. 1, a Wheatstone bridge was fabricated separately on each of the two flat surfaces. That is, a Wheatstone bridge is associated with the Y deflection beam 12 as well as a Wheatstone bridge associated with the X deflection beam 15. In order to obtain proper output, both sides of the thin section required strain gauges which were then wired into the complete Wheatstone bridge. This led to a very complex wiring and assembly technique as the wires had to be directed from one surface of the beam section to the other surface. Thus, as indicated the wiring to complete the bridge connections requires traversing back and forth from one side of the beam to the other side. This complex wiring scheme precludes a simple hermetic structure for the unit. In the prior art, as seen, the strain gauges were positioned to measure the longitudinal stress on the beams. To form a Wheatstone bridge, both tensile and compressive stresses were required. To access both compressive and tensile stresses the gauges were placed on both sides of the beam. Thus, the wiring to complete the bridge would require traversing back and forth, from one side of the beam and then to the other side of the beam. This complex wiring was time intensive requiring complex assembly techniques. This factor precluded the provision of a hermetic structure to enclose the unit. Thus, the prior art device depicted in FIG. 1 was not hermetically sealed.

As seen in FIG. 1, an extending longitudinal rod or joystick is coupled to section 16, which enables one to move the joystick in the X and Y positions at any angle of 360° rotation. The sensors serve to produce outputs based on the position of the joystick. As is known, the beam section 12 as well as beam section 15 will deflect when the joystick is moved by a user. The deflection of the sections 12 and 15 cause the strain gauges which may for example be piezoresistive devices to produce outputs proportional to the movement of the joystick in both the X and Y directions. These voltage outputs are then processed to enable the user to steer the vehicle such as a helicopter or other vehicle and the voltages may further also be used to present a X-Y display indicating to the user where the joystick is in regard to a central position.

As one can ascertain, the joystick sensor as depicted in FIG. 1 has gauges on both sides of the beam section 12 and 15 and the sensors are exposed to the environment and therefore are not hermetically sealed and can be subjected to deleterious substances in the environment.

In addition, using the beam structure as depicted in FIG. 1 made it virtually impossible to obtain a hermetically sealed structure. The prior art design for fabricating joysticks operative in the X and Y direction required complex machining of the structure. In addition the beams would require gauging on both sides of the beams resulting in complex wiring and assembly techniques. As one can see from FIG. 1 the structure shown which is the prior joystick sensor, has a Y deflection beam section, a X deflection beam section, both beams are separated by a central section 20 the joystick further has a handle accommodating section 16 and a base 11. Thus, the prior art structure is relatively complex and required a great deal of machining as the structure was usually integrally formed.

Figure 2:
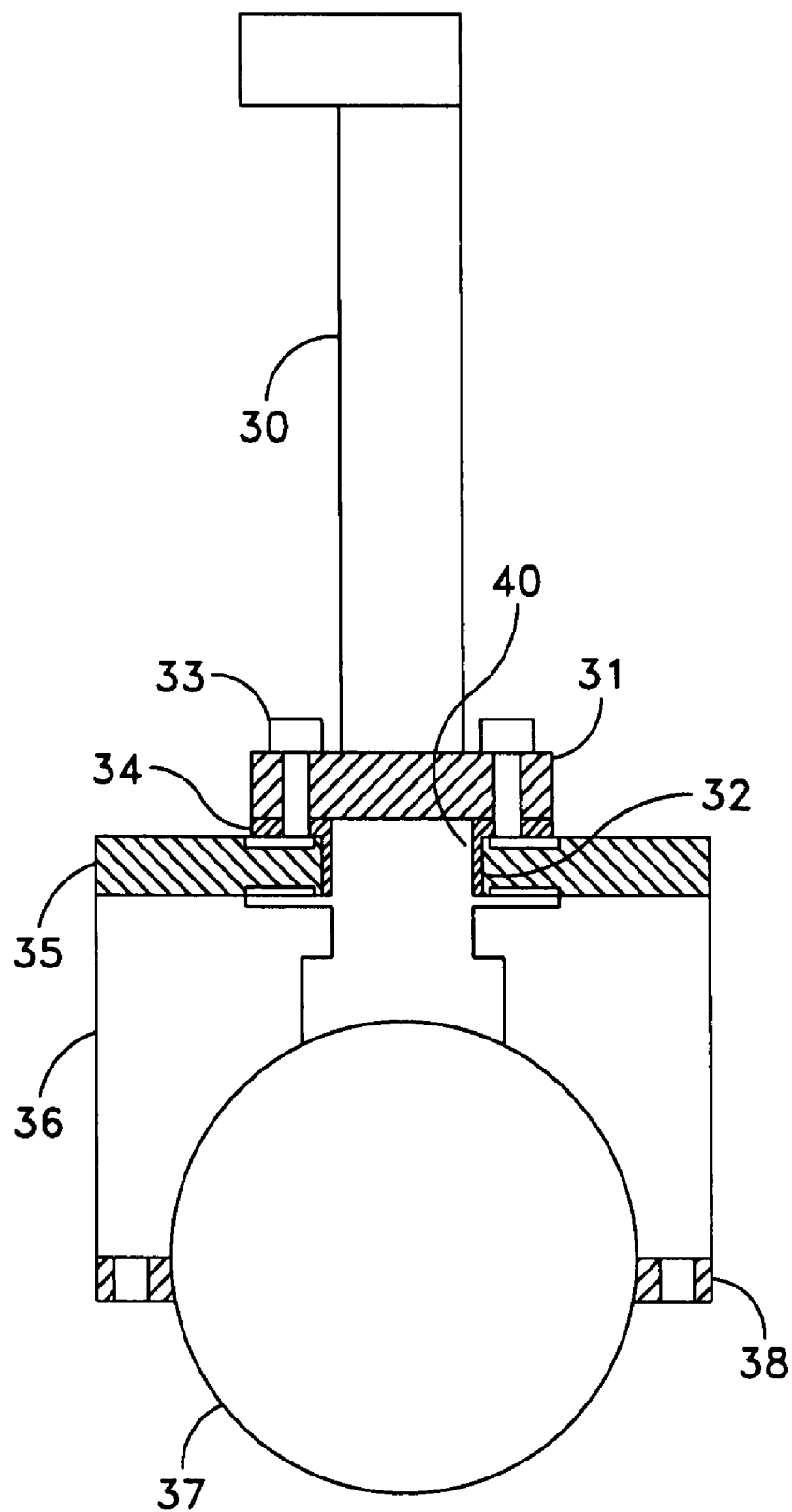
FIG. 2 is a partial cross-sectional view of a joystick sensor apparatus according to this invention.

Referring to FIG. 2 there is shown a joystick sensor apparatus according to this invention. As seen in FIG. 2 the joystick 30 basically is capable of operating in a typical fashion. The joystick operates or can be moved in the X-Y plane and as is well known can be rotated through a complete 360°. The purpose of the sensors, is to determine the position of the joystick and to provide X-Y coordinates for control of a motor or other device. The joystick 30 terminates in a bottom flange 31. The flange is a circular flange and contains apertures which hold mounting screws 33. The flange 31 is positioned on a threaded adapter ring plate 34. The adapter ring plate 34 has an extending central tubular section 32, where section 32 is threaded and which section 32 of the adapter ring plate 34 is inserted into threaded aperture 40. The adapter ring 34 has threads which engage the threaded aperture 40 of a sensor plate 35. The adapter ring plate 34 coacts with the sensor plate 35 via the tubular section 32. As will be explained the sensor plate 35 contains piezoresistive sensors and essentially operates to provide outputs proportional to the X and Y coordinates of the joystick. The sensor plate 35 is mounted on an aluminum adapter plate 36. In any event, the threaded adapter ring 34 is inserted into the sensor plate 35 via section 32. The bottom surface of the adapter ring plate 34 overlays the top surface of the sensor plate 35. The joystick flange which is shown as numeral 31 is bolted to the threaded adapter ring plate 34 which coacts with the top surface of the sensor plate.

Figure 3:
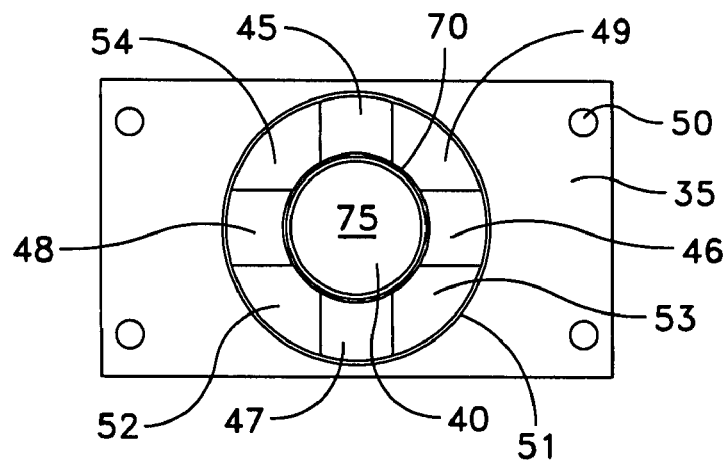
FIG. 3 is a top plan view of a sensor plate employing beams according to this invention.

Referring to FIG. 3 there is shown a top plan view of the sensor plate 35 as depicted in FIG. 2. The sensor plate 35 has a central threaded aperture 40 associated with a central hub area 75. The central hub area 75 has a peripheral flange or rim 70 surrounding aperture 40. As will be seen the flange 70 is thicker than the thickness of the beams as 45, 46, 47 and 48. Extending from the inner surface of the rim 70 are the four beams 45, 46, 47 and 48. The beams, as seen, are located at 90° intervals about aperture 40. For example, beam 46 and 48 are positioned along a common central diameter of aperture 40, while beams 45 and 47 are positioned along a diameter transverse to the diameter upon which beams 46 and 48 are located. The aperture 40 as depicted in FIG. 2 is shown and is coaxial with the outer aperture 51. Thus, as seen, the beams 45, 46, 47 and 48 emanate from the rim 70 about the central aperture 40 and are symmetrically positioned along the X and Y axes. In between the beams, there are opened area as 49 which depicts the open area between beams 45 and 46. There is also open area 52 between beams 48 and 47 and open area 53 between beams 46 and 47 and open area 54 between beams 45 and 48. The sensor plate 35 also contains peripheral apertures such as 50 for mounting purposes. The aperture 50 can accommodate mounting screws or bolts to secure sensor plate 35 to the adapter plate 36.

Figure 4:
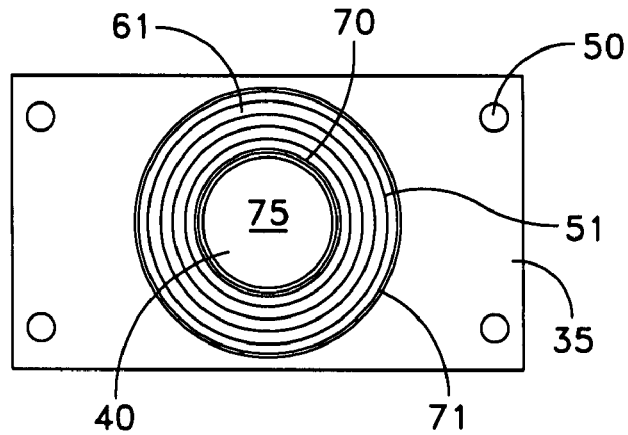
FIG. 4 is a top plan view of the sensor plate of FIG. 3 further showing an isolation diaphragm.

As will be explained, and is shown in FIG. 4 the entire beam structure is covered by an isolation diaphragm 61. The isolation diaphragm 61 is a convoluted diaphragm, as for example, depicted in the top view of FIG. 4. The exact nature of the diaphragm will be more clearly explained subsequently. As seen in FIG. 4, the inner aperture 40 associated with the sensor plate 35 and the peripheral flange 70 are depicted. The outer aperture 51 is formed in the surface of the rectangular plate 35 and is of relatively the same thickness as the rim 70.

Figure 5:
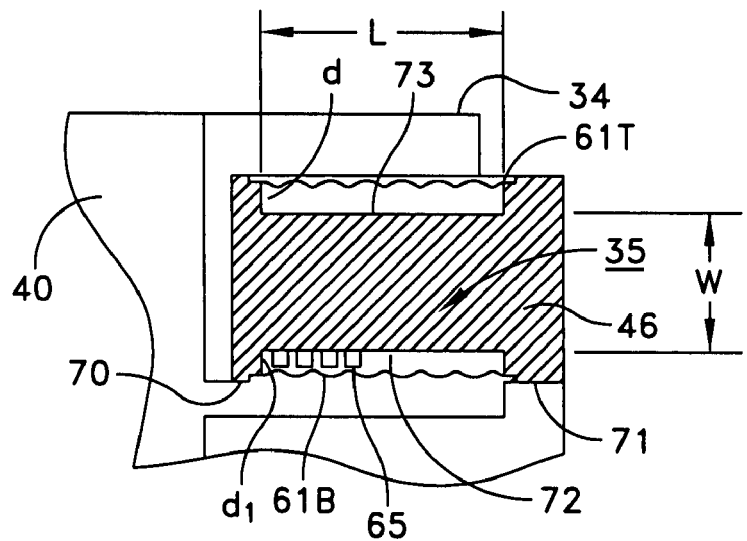
FIG. 5 is a partial cross-sectional view of a beam and sensor arrangement according to this invention.

Again, referring to FIG. 5 there is shown the peripheral flange or rim 70 associated with the inner aperture 40 and surface of plate 35, the remainder of the plate 35 is not shown. The beam 46 extends from the rim 70 to the plate section 71. Located on the beam are piezoresistive sensors or gauges as 65. The gauges are four in number and the orientation of the gauges will be explained. Shown also in FIG. 5 is that the top portion of the beam is covered by a convoluted isolation diaphragm designated as 61T, indicative of 61 top. While the bottom of the beam is also covered by a convoluted diaphragm designated 61B for 61 bottom. As seen the gauges are positioned between the diaphragm 61B and the bottom surface 72 of the beam 46. The top surface 73 of the beam has no gauges located thereon. It is also understood that top and bottom are relative and thus, can be interchanged. Also, shown in FIG. 5, is the threaded adapter ring 34 which has a surface which coacts with the top surface of the convoluted diaphragm 61T. While the bottom surface of the threaded adapter ring 34 is above the top surface of the convoluted diaphragm, they do not touch or transmit force. The adapter ring transmits its force to the sensor through the tube section 32, which acts on the rim 70, which imparts bending of the beams. The threaded adapter ring 34 is coupled to the joystick flange 31 by fasteners 33 (FIG. 2). Again, referring to FIG. 5, the typical beam length designated by L is 0.4 inches, while the width designated by W is 0.190 inches. The dimensions of course are relative and each beam as depicted in FIG. 3 is of the same dimensions, thus there are four beams where each beam is 0.19 inches wide (W) and approximately 0.4 long (L). Thus, each beam is thinner than the thickness of adapter ring plate 35 and of the rim 70. The beams as 46 extend an equal distance from the top and bottom surfaces of the plate 35 and rim 70. Thus, as seen the distance d of the beam 46 from the top surface of the plate 35 and rim 70 is relatively equal to the distance d1 from the bottom surface of plate 35 and rim 70. The equal distances are not required, though they are designed symmetrically here. Other applications may dictate unequal distances.

Figure 6:
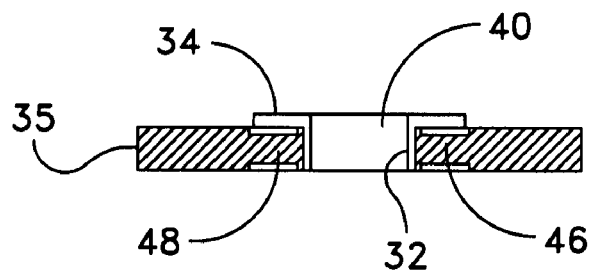
FIG. 6 is a cross-sectional view depicting a sensor plate and a threaded ring aperture plate according to this invention.

Referring to FIG. 6, there is shown the sensor plate 35 having beam sections 46 and 48 in conjunction with the adapter ring plate 34. Thus, as clearly shown in FIG. 6, the threaded adapter ring 34 has the tubular section 32 inserted into aperture 40 and beams as 46 and 48 on the sensor plate 35 and are contacted via the diaphragms by the extending surface portions of the threaded aperture ring 34. As shown clearer in FIG. 2, the joystick flange 31 is positioned on the threaded aperture ring and is secured thereto. Therefore, any movement of the joystick 30 causes a movement or a deflection of the threaded aperture ring plate 35 which coacts with the convoluted isolation diaphragms as 61T and 61B, depicted in FIG. 5. While the bottom surface of the threaded adapter ring 34 is above the top surface of the convoluted diaphragm, they do not touch or transmit force. The adapter ring transmits its force to the sensor through the tube section 32, which acts on the rim 70, which imparts bending of the beams.

Figure 7:
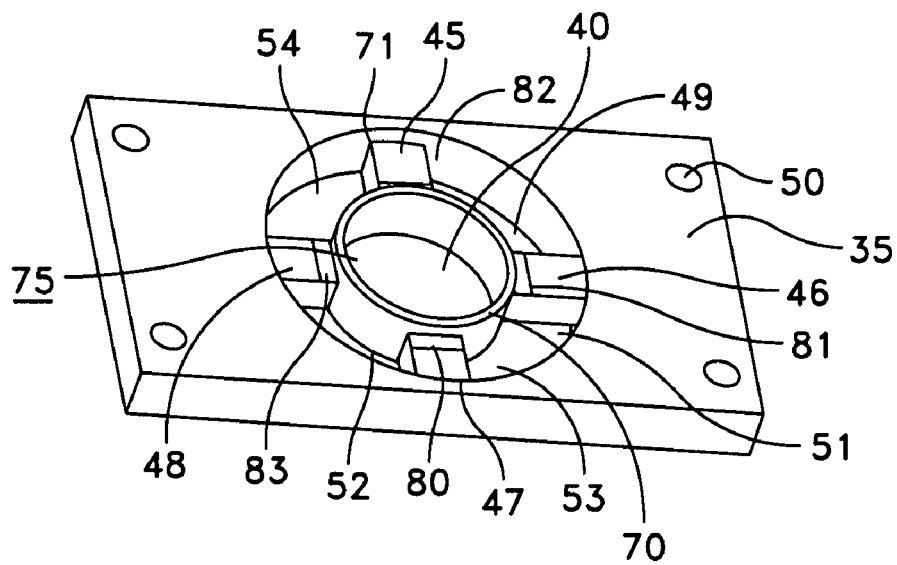
FIG. 7 is a perspective view of a beam and sensor arrangement according to this invention.

Referring to FIG. 7 there is shown a perspective view of the sensor plate 35. In most instances the same reference numerals have been utilized to depict corresponding parts from the other figures. Thus, as seen in FIG. 7, the sensor plate has a central aperture 40 which is essentially surrounded by the peripheral flange or rim 70. Also shown is the aperture 51 whereby the beams 45, 46, 47 and 48 extend from the peripheral surface of aperture 51 to the peripheral flange 70 surrounding aperture 40. The aperture 51 is coaxial with aperture 40 and has the beams emanating from the outer periphery and below the surface of plate 35. The beams are symmetrically disposed, as seen in FIG. 6, about the periphery of the outer coaxial aperture 51 and aperture 40. As shown in FIG. 5, the reference numeral 71 refers to the spaces d and d1 of the top and bottom surfaces of plate 35. As seen in FIG. 5 and FIG. 7, each beam as 46 depicted in FIG. 5 is symmetrically located between the circular flange 70 and the outer aperture 51. The spaces between each of the beams as depicted in FIG. 3 are clearly shown in FIG. 7 and the same reference numerals again have been indicated to depict space 49, 51, 52 and 54. Thus, the construction and nature of the sensor plate 35 should be clearer from the perspective diagram depicted in FIG. 7. Also shown in FIG. 7 is that each of the beams have a gauge configuration or gauge patch positioned thereon. Thus, beam 47 contains a gauge or patch configuration 80, while beam 46 contains the gauge configuration 81, beam 45 contains gauge configuration 82 and beam 48 contains gauge configuration 83. The gauges are typically piezoresistive gauges which are fabricated from silicon and have metallized contacts. It is immediately noted that all the gauge configurations associated with the beams are located on the same beam surface and therefore can be easily wired and accessed. It is also noted that the convoluted diaphragm which would enclose the top as well as the bottom of the beams, is not shown. The convoluted diaphragms 61 are positioned over the top and bottom surfaces of the beams and one can therefore hermetically seal the strain gauge patches associated with each of the beams.

Figure 8:
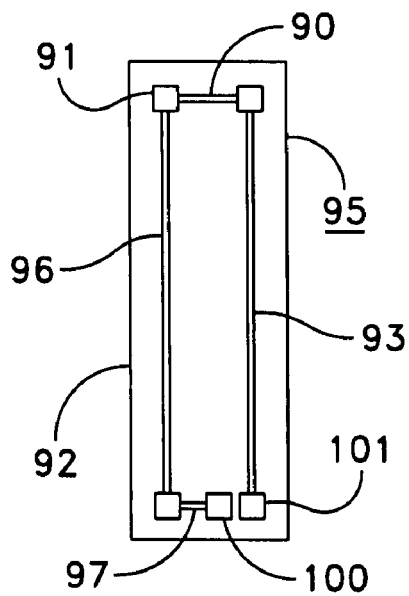
FIG. 8 is a top plan view of a sensor patch array according to this invention.

Referring to FIG. 8, there is shown a typical strain gauge patch configuration employed. Essentially the patch contains a silicon substrate 92. Located on the silicon substrate 92 are piezoresistive sensors responding to axial tension/compression stresses as well as Poisson gauges. Referring to FIG. 8, gauge 90 or sensor 90 is a Poisson gauge, while gauge 93 can operate in a tension/compression mode. This mode is also indicative of gauge 96 as well as gauge 97. Thus, as shown in FIG. 8, there are four gauges located on the silicon substrate which consists of gauges 90, 93, 96 and 97. Also positioned between gauges are metallized contacts as contact 91. As seen the gauge configuration is open and has two contacts at the bottom depicted as contacts 100 and 101. Each of these contacts is a metallized contact. Thus, the configuration of gauges as shown in FIG. 8 can be wired whereby one can utilize the gauges as part of a bridge circuit in conjunction with other gauges located on other beams. Each beam as indicated above, and as shown in FIG. 7 has a gauge patch, which includes the gauge configuration depicted in FIG. 8. Thus, the present joystick sensor uses the strain gauge patch 95. The patch incorporates 4 gauges in a preconfigured bridge arrangement. One employs silicon and the silicon is selected to be oriented in the <110> orientation to maximize the piezoresistive coefficient in mutually orthogonal axes. The patch incorporates the axial and Poisson gauges in a single piece or single silicon part. Installation of the patch requires only access to one side of the beam as depicted in FIG. 7 resulting in a far simpler assembly technique as compared to those techniques existing in the prior art. In any event, the crystal orientation is selected as above and operation is indicated in the following mathematical analysis proves the operation of the sensor arrangement as depicted in FIG. 8 to determine X-Y and Z positioning.

Crystal Orientation

The Poisson's stress is related to the compressive stress by Poisson's ration v. In silicon, v is typically 0.3.

$$\sigma_p = v\sigma_c \quad [1]$$

For a piezoresistive gage, the resistance equation is $$\Delta R/R = \sigma_x \pi_x + \sigma_y \pi_y + \sigma_z \pi_z \quad [2]$$

This relates the change in gage resistance $\Delta R$ divided by the unstressed resistance R, to the stresses $\sigma$ in the subscripted directions, and the piezoresistive coefficients applicable to the piezoresistor. This applicability is governed by basic crystal species, crystallographic orientation, doping species, doping level, and current direction related to stress direction.

For a gauge with the current in the same direction as the force (gage C)

(1) The x direction is associated with compressive stress. The stress is transverse to the current flow in the gauge so the $\pi_x$ coefficient becomes $-\pi_{44}/2$ (2) The y direction is associated with Poisson's ratio stress. The stress is longitudinal to the current flow in the gauge so the $\pi_y$ coefficient becomes $\pi_{44}/2$ (3) The z direction is associated with out of plate stress. The stress is transverse to the current flow in the gauge so the $\pi_z$ coefficient becomes 0.

$$\Delta R/R = \sigma_c(-\pi/2) + \sigma_p \pi_{44}/2 + \sigma_z 0 \quad [3]$$

Inserting the Poisson ration [1], this [3] becomes $$\Delta R/R = -\sigma_c(\pi_{44}/2)(1+v) \quad [4]$$

For a gauge with the current in the orthogonal direction as the force (gage P)

(4) The x direction is associated with compressive stress. The stress is longitudinal to the current flow in the gauge so the $\pi_x$ coefficient becomes $\pi_{44}/2$ (5) The y direction is associated with Poisson's ration stress. The stress is transverse to the current flow in the gauge so the $\pi_y$ coefficient becomes $-\pi_{44}/2$ (6) The z direction is associated with out of plate stress. The stress is transverse to the current flow in the gauge so the $\pi_z$ coefficient becomes 0.

$$\Delta R/R = \sigma_c(\pi_{44}/2) + \sigma_p(-\pi_{44}/2) + \sigma_z 0 \quad [5]$$

Inserting the Poisson ration [1], this [5] becomes $$\Delta R/R = \sigma_c(\pi_{44}/2)(1+v) \quad [6]$$

Figure 9:
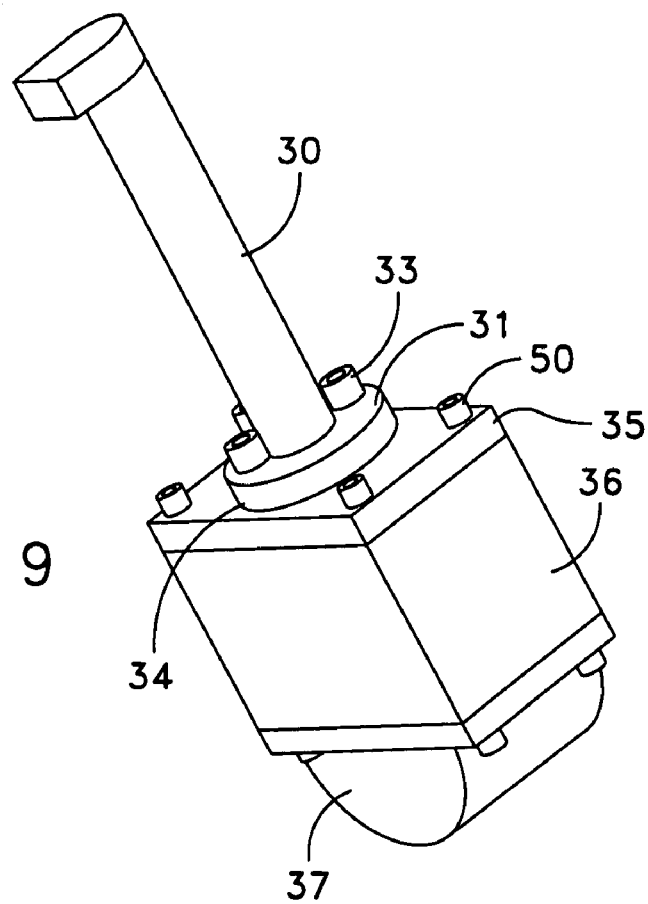
FIG. 9 is a perspective plan view of the joystick apparatus.

Referring to FIG. 9 there is shown a perspective view of the joystick sensor according to this invention. Essentially FIG. 9 employs the same reference numerals as used in FIG. 2 to denote corresponding parts. As seen in FIG. 9 the joystick 320 and the bottom flange member 31 are bolted to the threaded adapter ring 34. The adapter ring 34 is positioned on the sensor plate as depicted in FIG. 2. The sensor plate 35 as indicated contains the beams as well as the gauge patch associated with each beam. There is an aluminum adapter module 36 depicted and a motor mount 37. The movement of the joystick determines X-Y coordinates for activating the motor according to the X-Y coordinates. It is understood that the joystick can be utilized to determine X-Y directions in many applications which do not necessarily include motors and the operation will suffice for any application where a joystick is employed. Thus the stress profile of the disclosed joystick designs include tensile, compression, Poisson, and torsional stresses. As the joystick is subjected to a force along one axis, the beams in that axis will be subjected to the moment at the free end at the inner hub. This moment will include a tensile and compressive stress in the beams along the associated axis. The positive/negative stress will be opposite on the opposing surface of the beam as well as on the opposite side of the central hub. In addition as the beam is bending a Poisson stress will be experienced perpendicular to the bending axis. The beams in the orthogonal axis will experience a torsional stress as they will see a twist which is perpendicular to their central axis. The design of the beams is such that the tensile and compressive stresses are maximized while the torsional stresses are minimized. The axial stresses, which are the major stresses will provide about 500 microstrain for the formation of the Wheatstone bridge and voltage output for the unit. The Poisson stresses are the next major stress in the structure. These stresses will allow the formation of the Wheatstone bridge on a single side of the beam which thereby simplifies assembly of the unit and allows a simple hermetic structure to enclose the unit. The torsional stresses on the orthogonal beam set are at least an order of magnitude smaller than the tensile stresses. They are on the order of 15 microstrain for the above noted dimensions. This will allow cross axis signals to be very small thus not affecting position or measurement of the joystick. Using the tensile and compressive axial stresses, as well as the Poisson stresses will allow the strain gages to be placed on one side of the beam. The tensile, compressive and Poisson strains are all accessible from a single side, eliminating the cross wiring of the prior art to access the opposite side of the beam. In addition cross wiring to the other side of the central hub is eliminated as all strains can be accessed on one beam. The four strain gauges can be incorporated on a single strain patch as shown for example in FIG. 8 using the properties of silicon to advantage. Using a silicon with 110 crystal directions, orthogonal to each other will allow the piezoresistive coefficients to be maximized for both the tensile/compressive and Poisson gauges. In addition, the strain gauge patches minimize space and wiring allowing multiple patches to be place on the beams resulting in a simple multiple redundant system.

Figure 10:
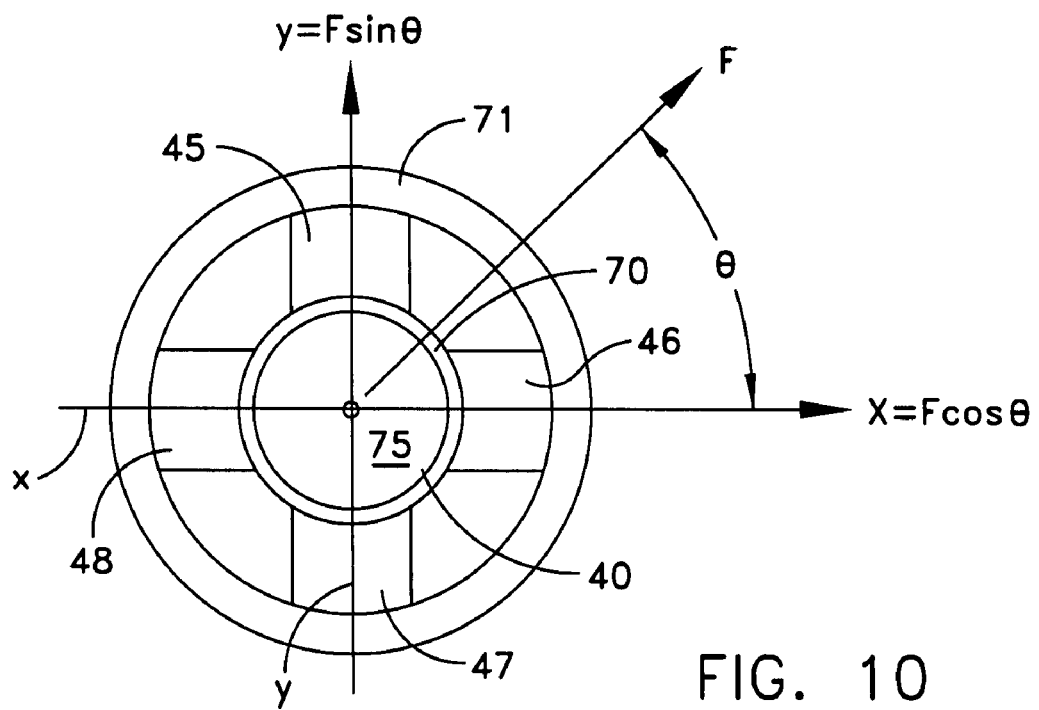
FIG. 10 is top plan view depicting the beam and sensor apparatus according to this invention.

Referring to FIG. 10 there is shown a top plan view of the beam arrangement according to this invention. As seen the beams 45, 46, 47 and 48 are directed from the central hub area 75 containing rim 70 associated with aperture 40. The beams again are symmetrically directed from the central hub area 75 to the outer peripheral edge 71. The beams shown in FIG. 10 utilize the same reference numerals as depicted above. In any event, as one can see, beams 46 and 48 are directed along the X axis while beams 45 and 47 are directed along the Y axis. The beams are symmetrically disposed along each of the central X and Y axes which as indicated above, are transverse to each other. The joystick sensing structure can detect and measure positions in a full 360° around the joystick axis which is the center point of the structure designated as CP. As the joystick is moved from a major axis, as for example the X or Y axis, the beams will experience as stress proportional to the vector resolution of the position. For example, for a joystick position at 45° between the X and Y axes, the beam will experience stresses proportional to the vector resolution, as indicated on the diagram by the X and Y equations where $X=F \cos \theta$ while $Y=F \sin \theta$. As seen in FIG. 10 the force F is shown with the angle $\theta$. In any event, the X and Y coordinates are the force components in each orthogonal direction and $\theta$ is the angle as measured from the X axis. At 45° each axis will experience $\sqrt{2}/2$ or 0.707 times the force applied to the joystick. The stress and output of each axis will be proportional, reflecting this intermediate position. Thus, the joystick as shown above, is hermetically sealed thus protecting the sensors in all types of environment where the joystick as indicated is simple to utilize and simple to wire using various bridge configurations. The sensor patch as indicated can be redundant and multiple patches can be placed on each beam.

It should be apparent to one skilled in the art that there are many modifications and alternative configurations that can be employed. All of which are deemed to be encompassed with the spirit and scope of the claims appended hereto.

What is claimed is:

1. A joystick sensor apparatus, comprising:
a load cell comprising:
an outer circular peripheral frame with an inner central concentric hub area, said load cell having beam members positioned between said central concentric hub area and said outer circular peripheral frame, wherein said inner central area is joined by at least two symmetrical beams, each beam being thinner than said frame and directed along a common diameter wherein a first beam is directed from an inner edge of said peripheral frame to an outer edge of said central area, a second beam is directed along said diameter from an oppositely opposed inner edge of said peripheral frame to an oppositely opposed outer edge of said inner area, a third beam is directed from an inner edge of said peripheral frame to an outer edge of said central area, and a fourth beam is directed along said diameter from an oppositely opposed inner edge of said peripheral frame to an oppositely opposed outer edge of said inner area, said beams being below the top surfaces of said peripheral and central areas and above the bottom surfaces thereof,
at least a first strain gauge positioned on a surface of one beam and at least a second strain gauge positioned on a corresponding surface of said second beam, at least a third strain gauge positioned on said third beam and at least a fourth strain gauge positioned on said fourth beam, and
a top surface and a bottom surface cover members hermetically enclosing said beams and strain gauges, wherein said top cover member is a convoluted, with the tops of said convolutions facing said beams when said top cover member covers said beams and said bottom cover member secured to a bottom surface of said peripheral area to cover said beams and said strain gauges, and
a joystick coupled to said central hub area and operative when moved to cause said gauges when to be biased and to provide outputs proportional to the X-Y movement of said joystick.

2. The joystick sensor apparatus according to claim 1, wherein said first and second pair of strain gauges are connected in a Wheatstone bridge array.

3. The joystick sensor apparatus according to claim 2, wherein said strain gauges are piezoresistive strain gauges.

4. The joystick apparatus according to claim 1, further including a Poisson strain gauge mounted on said first beam and at least a fifth strain gauge also mounted on said first beam, with a sixth strain gauge mounted on said second beam in a location corresponding to the location of said Poisson gauge on said first beam and at least a seventh strain gauge mounted on said second beam in a location corresponding to said first beam location of said fifth gauge.

5. The joystick apparatus according to claim 1, wherein each beam is generally of a rectangular configuration with one side of said rectangle located at the outer edge of said central area and with the opposite side of said rectangle located at the inner edge of said peripheral area.

6. The joystick apparatus according to claim 1, wherein said strain gauges are silicon piezoresistors.

7. The displacement transducer according to claim 1, further including a plurality of apertures located an said peripheral area to enable the mounting of said transducer.

8. The joystick apparatus according to claim 4, wherein said first, second, third and fourth gauges are connected in a Wheatstone bridge configuration.

9. The joystick apparatus according to claim 1, wherein said outer peripheral area is circular with said inner central area circular and concentric therewith.

10. The joystick apparatus according to claim 1, further including a first Poisson gauge positioned on said first beam, with a first tension/compression gauge positioned on said first beam, and a corresponding second Poisson gauge positioned on said second beam with a second tension/compression gauge positioned on said second beam, with a third Poisson gauge positioned on said third beam with a third tension/compression gauges positioned on said third beam, with a fourth Poisson gauge positioned on said fourth beam with a fourth tension/compression gauge positioned on said fourth beam.

11. The joystick apparatus according to claim 10, wherein said gauges on diametrically opposed beams are connected as a Wheatstone bridge.

12. The joystick apparatus according to claim 11, wherein said gauges are silicon piezoresistors.

13. The joystick apparatus according to claim 1, wherein said beams are rectangular configurations with one side of the configuration located at said central section and with the other side located at said peripheral section.

14. The joystick apparatus according to claim 11, wherein each beam has more than one located thereon.

* * * * *